(12) United States Patent
Thomas et al.

(10) Patent No.: US 10,198,945 B2
(45) Date of Patent: Feb. 5, 2019

(54) CAMERA SYSTEM

(71) Applicant: JENOPTIK Robot GmbH, Monheim am Rhein (DE)

(72) Inventors: William Vivian Thomas, Berkshire (GB); Kyle Rhodes, Berkshire (GB); Graeme Southwood, Berkshire (GB)

(73) Assignee: Jenoptik Robot GmbH, Monheim am Rhein (DE)

( * ) Notice: Subject to any disclaimer, the term of this patent is extended or adjusted under 35 U.S.C. 154(b) by 0 days.

(21) Appl. No.: 15/562,908

(22) PCT Filed: Mar. 29, 2016

(86) PCT No.: PCT/EP2016/056830
§ 371 (c)(1),
(2) Date: Sep. 29, 2017

(87) PCT Pub. No.: WO2016/156337
PCT Pub. Date: Oct. 6, 2016

(65) Prior Publication Data
US 2018/0082580 A1    Mar. 22, 2018

(30) Foreign Application Priority Data
Mar. 30, 2015    (GB) .................................. 1505395.2

(51) Int. Cl.
*G06K 9/32*  (2006.01)
*G08G 1/04*  (2006.01)
*G01S 19/14*  (2010.01)
*G08G 1/017*  (2006.01)
*G08G 1/054*  (2006.01)

(52) U.S. Cl.
CPC ............ *G08G 1/0175* (2013.01); *G01S 19/14* (2013.01); *G06K 9/325* (2013.01); *G08G 1/04* (2013.01); *G08G 1/054* (2013.01)

(58) Field of Classification Search
None
See application file for complete search history.

(56) References Cited

U.S. PATENT DOCUMENTS 6,856,935 B1 *   2/2005   Fehlis ..................... G01S 1/022
                                                      348/E5.022
7,333,725 B1 *   2/2008   Frazier ................... G03B 31/04
                                                      348/207.99

(Continued)

FOREIGN PATENT DOCUMENTS

GB         2482243 A        1/2012
WO    WO 2009/018647 A1     2/2009

*Primary Examiner* — Thomas S McCormack
(74) *Attorney, Agent, or Firm* — Muncy, Geissler, Olds & Lowe, P.C.

(57) ABSTRACT

A traffic monitoring system is provided. The traffic monitoring system comprises: a camera system configured to capture images of vehicles, the camera system comprising a first wireless time receiver configured to receive a wirelessly transmitted time signal; and a light system configured to selectively illuminate the vehicles, the light system being spaced apart from the camera system, wherein the light system comprises a second wireless time receiver configured to receive the wirelessly transmitted time signal such that the image capture by the camera system and the illumination by the light system is synchronized.

25 Claims, 1 Drawing Sheet

(56) References Cited

U.S. PATENT DOCUMENTS

| | | |
|---|---|---|
| 2003/0193981 A1 | 10/2003 | Matveev |
| 2007/0237510 A1* | 10/2007 | Clark ................. G03B 15/02 396/56 |
| 2009/0009596 A1 | 1/2009 | Kerr et al. |
| 2011/0313644 A1 | 12/2011 | Grassi |
| 2012/0002045 A1 | 1/2012 | Tony et al. |
| 2013/0120636 A1 | 5/2013 | Baer |
| 2013/0235203 A1* | 9/2013 | Billington ............ G06K 9/2036 348/148 |

* cited by examiner

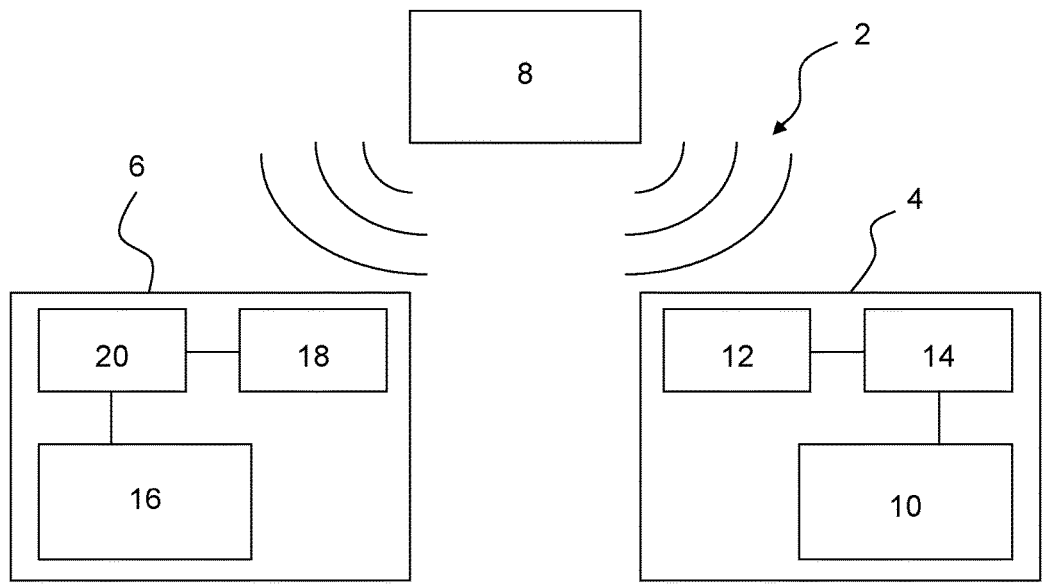

CAMERA SYSTEM

TECHNICAL FIELD

The present disclosure relates to apparatus and systems for capturing illuminated images and is particularly, although not exclusively, concerned with capturing images illuminated by remote lighting systems.

BACKGROUND

Automatic Number Plate Recognition (ANPR) cameras are utilised in many environments to read vehicle registration plates in order to track vehicle positions, movements, and speeds. They have many applications including security, electronic toll collection, law enforcement and traffic control.

In order for ANPR systems to operate reliably, high quality images must be captured by the ANPR camera to be processed. In low light conditions, additional lighting may be required to ensure the images are correctly illuminated. Such lighting may be provided on the camera itself or may be provided by a separate lighting system positioned remotely from the camera.

STATEMENTS OF INVENTION

According to an aspect of the present disclosure, there is provided a traffic monitoring system comprising: a camera system configured to capture images of vehicles, the camera system comprising a first wireless time receiver configured to receive a wirelessly transmitted time signal; and a light system configured to selectively illuminate the vehicles, the light system being spaced apart from the camera system, wherein the light system comprises a second wireless time receiver configured to receive the wirelessly transmitted time signal such that the image capture by the camera system and the illumination by the light system is synchronised.

The first and/or second wireless time receiver may be a Global Navigation Satellite System (GNSS) receiver, for example a Global Positioning System (GPS) receiver.

The camera system may be configured to capture images at a substantially constant frequency. The light system may be configured to illuminate at a substantially constant frequency.

The first and/or second wireless time receiver may transmit a timing signal to a camera of the camera system and/or a light of the light system respectively. The timing signal from the first and/or second wireless time receiver may be a signal indicating the start of a second. The timing signal from the first and/or second wireless time receiver may be a pulse per second signal. The PPS signal may be a high precision PPS signal. For example, the accuracy of the signal may be greater than 1 microsecond per second.

The camera system may further comprise a second camera; wherein the capture of images by the second camera is synchronised with the light system.

The second camera may capture images at a different frequency to the first camera. Additionally or alternatively, the operation of the second camera system may be triggered at discrete points in time.

The camera system may be configured to capture images with a set delay from the start of a second indicated by the timing signal.

The camera system and/or the light system may further comprise a clock, the time on the clock may be determined by the timing signal from the first and/or second wireless time receiver respectively. The timing of the image capture by the camera system and/or the illumination provided by the light system may be determined according to the time stored on the respective clock. The camera system may be configured to capture images at a predetermined time or times. Additionally or alternatively, the camera system may be configured to capture images with a set delay from a predetermined time or times. The delay may be programmable.

The camera system may comprise an Automatic Number Plate Recognition (ANPR) camera.

The exposure time of images captured by the camera system may be variable. The exposure time of images captured by the camera system may vary in a predetermined pattern. Additionally or alternatively, the exposure time of images captured by the camera system may vary according to the current lighting conditions and/or time.

The light system may be configured to provide pulses of illumination. The light system may be configured to provide illumination only when an image is being captured. The period of illumination provided by the light system may be substantially equal to the period over which an image is captured by the camera system, i.e. the exposure time of the camera.

The frequency at which the light system provides periods of illumination may be substantially equal to the frequency at which images are captured by the camera system. Alternatively, the frequency at which the light system provides periods of illumination may be an integer multiple of the frequency at which the camera system captures images.

The light system may be a strobe light system.

The light system may provide periods of illumination with a frequency of 30 Hz or greater.

The period of illumination provided by the light system may be substantially equal to the longest possible exposure time of the camera system.

According to another aspect of the present disclosure, there is provided a camera system for use in the traffic monitoring system according to any of the above-mentioned aspects of the disclosure.

According to another aspect of the present disclosure, there is provided a light system for use in the traffic monitoring system according to any of the above mentioned aspects of the disclosure.

According to another aspect of the present disclosure, there is provided an image capturing system comprising: a camera system configured to capture images, the camera system comprising a first wireless time receiver configured to receive a wirelessly transmitted time signal; and a light system configured to selectively provide illumination, the light system being spaced apart from the camera system, wherein the light system comprises a second wireless time receiver configured to receive the wirelessly transmitted time signal such that the image capture by the camera system and the illumination by the light system is synchronised.

To avoid unnecessary duplication of effort and repetition of text in the specification, certain features are described in relation to only one or several aspects or embodiments of the disclosure. However, it is to be understood that, where it is technically possible, features described in relation to any aspect or embodiment of the disclosure may also be used with any other aspect or embodiment of the disclosure.

BRIEF INTRODUCTION TO THE FIGURES

For a better understanding of the present disclosure, and to shown more clearly how it may be carried into effect, reference will now be made, by way of example, to the accompanying drawings, in which:

FIG. 1 is a schematic representation of a camera system and light system according to an example of the present disclosure.

DETAILED DESCRIPTION

With reference to FIG. 1, a system 2 for capturing illuminated images according to an example of the present disclosure is shown. The system 2 comprises a camera system 4 and a lighting system 6.

In the system depicted in FIG. 1, the camera system 4 comprises a camera 10, a first Global Positioning System (GPS) receiver 12 and a camera controller 14. The camera 10 may be any kind of camera capable of capturing an image, such as a digital camera. The camera 10 may capture images using visible and/or infra-red light. The camera 10 may be a traffic monitoring camera, for example an Automatic Number Plate Recognition (ANPR) camera. The camera 10 may capture images continuously at a predetermined frequency, such as 15 frames per second, or may capture images at discrete points in time with no predetermined constant period between images, e.g. if a speeding incident is detected. The camera system 4 may comprise a plurality of cameras which may capture images with different frequencies and/or at different discrete points in time.

The camera controller 14 may be provided as part of the camera 10 or may be provided as a separate component within the camera system 4. The camera may be operatively coupled to the camera controller 14. The camera controller 14 may control the operation of the camera and may control the aperture, exposure, focus and/or any other parameter of the operation of the camera. The camera controller may control the timing and/or frequency with which images are captured by the camera.

As shown in FIG. 1, the camera controller 14 may receive an input from the first GPS receiver 12. The first GPS receiver 12 may be provided within the camera system 4 and may be provided as part of the camera 10 or camera controller 14. Alternatively, the first GPS receiver 12 may be provided separately. The input received by the camera controller 14 from the first GPS receiver 12 may be a high precision pulse per second (PPS) signal which provides an accurate indication of the precise start of each GPS second. The PPS signal may be used by the camera controller to determine the timing with which images are captured by the camera.

The first GPS receiver 12 may receive GPS signals from one or more GPS satellites 8. The PPS signal output from the first GPS receiver 12 may relate to a time received from the one or more GPS satellites 8. Additionally or alternatively, the PPS signal output from the GPS receiver 12 may relate to a time calculated based on the GPS signals received. The camera controller 14 may thereby control the timing of images captured by the camera 10 such that images are captured at specific times. The time at which an image is captured, may be considered to be the time at which light is exposed to a light sensor of the camera or the time at which the levels of light reaching a light sensor of the camera are recorded.

The camera controller 14 may be configured to control the camera to capture images after a delay or delays from the beginning of each second as defined by the PPS signal from the first GPS receiver. For example, images may be captured at 0.1, 0.2, 0.3 seconds after the beginning of each second. The length of the delay or delays, as well as the number of delays used by the camera controller may be programmable. If the frequency of the image capture is controlled, as described above, the number and length of the delays used may be adjusted accordingly, as the frequency is controlled.

The camera system 4 may comprise one or more additional cameras (not shown). The additional cameras may be controlled by the camera controller 14 or may be associated with one or more additional camera controllers (not shown). The additional camera controllers may also receive the input signal from the first GPS receiver 12. The additional cameras may be controlled in a similar way to the camera 10, as described above. Any description within this specification relating to the operation of the camera 10 and/or the camera controller 14 may be equally applied to any additional cameras and/or camera controllers provided within the camera system. The additional cameras may operate independently from the camera 10 and parameters used to control the additional cameras (e.g. frequency, delays, exposure, focus etc) may be different from the parameters used to control the camera 10.

In order to ensure images captured by the camera 10 are sufficiently illuminated in a range of light conditions, the light system 6, as depicted in FIG. 1, may be provided. The light system may comprise a light 16 which may be operatively connected to a light controller 20. The light 16 may produce light in the visible spectrum and/or the light 16 may produce light outside the visible spectrum, e.g. the light may be an infra-red light. The light 16 may comprise a plurality of lights of different colours or ranges of the electromagnetic spectrum. The light 16 may comprise a strobe light. The light controller 20 may control the timing with which the light 16 is switched on and off. The light 16 may be controlled to switch on and off with a set frequency and may provide pulses of light with a set duration. The light controller 20 may be programmable to set the frequency and/or duration of the light pulses. For example, the light controller 20 may be configured such that pulses of light are provided with durations greater than or equal to the exposure time of the camera 10 and are provided at the same frequency as the camera is capturing images.

The light controller 20 may receive an input from a second GPS receiver 18. The second GPS receiver 18 may be provided within the light system 6 and may be provided as part of the light controller 20. Alternatively, the second GPS receiver 18 may be provided separately. The input received by the light controller 20 from the second GPS receiver 18 may be a high precision PPS signal. The PPS signal may be used by the light controller 20 to determine the timing with which lighting is switched on and off.

Similarly to the first GPS receiver 12, the second GPS receiver 18 may receive a GPS signal from the one or more GPS satellites 8. The PPS signal output from the second GPS receiver 18 may relate to a time received from the one or more GPS satellites 8 or a time calculated based on the GPS signals received. When calculating the time, the second GPS receiver 18 may consider a different combination of signals to the first GPS receiver 12, however the calculated times may be substantially the same.

By considering the PPS signal from the second GPS receiver 18, the light controller 20 may control the operation of the light 16 such that pulses of light are provided at specific times. This may be similar to the way in which the camera controller controls the operation of the camera 10, as described above. The delays used by the light controller 20 may be the same as the delays used by the camera controller 14. The delays used by the light controller may be separately programmable to the delays used by the camera controller.

If the frequency of the light pulse is adjusted, as described above, the delays used by the light controller may be adjusted accordingly. In this way the lighting provided may be synchronised with the camera 10.

Additional lights (not shown) may also be provided within the lighting system 6 and may be associated with the light controller 20 or an additional light controller (not shown). The additional light controller may receive signals from the second GPS receiver 18 and may control the additional light or lights in a similar way to that described above. Any additional light, whether controlled by the light controller 20 or an additional controller may be controlled independently from the light 16 and any parameters affecting its operation, for example the frequencies, delays, durations etc described above, may be set and controlled separately. The additional light may provide illumination for the camera 10 or another camera. Any description within this document relating to the operation of the light 16 or the light controller 20 may be equally applied to any additional lights and/or light controllers provided.

The frequency of the light pulses provided by the light system 6 may be the same as the frequency at which images are captured by the camera system 4.

In some cases, it may be desirable for the frequency at which the light 10 operates to be higher than the frequency at which the camera captures images. For example, the lighting system may illuminate a stretch of road and it may be desirable to prevent drivers on the road from experiencing varying lighting conditions or flickering of the lights. In such circumstances, the frequency at which the lighting system operates may be increased and may be set to an integer multiple of the desired image capture frequency. In this way, the images may remain correctly illuminated whilst the light may not be perceived to flicker, for example, by drivers on the road.

By correctly configuring the control parameters of the camera system 4 and/or the lighting system 6, for example the delays and/or frequencies used by the light controller 20 and the camera controller 14 and/or the duration of the light pulses and/or the exposure time of the camera, the system 2 may be configured such that images captured by the camera 10 may be correctly illuminated by the light 16. This may allow ANPR software to correctly determine the characters on a number plate captured in the image.

In order to ensure suitable images are obtained, which are correctly exposed and can be processed by the ANPR software, the camera system 4 may operate to vary the exposure time of images captured. This variation may follow a set pattern, for example three different exposure times may be used and the camera may cycle through the different exposure times in a predetermined order. Alternatively, the camera may determine a desirable exposure time before capturing each image, for example the camera may measure the amount of light available or consider the time of day and may adjust the exposure of the image accordingly. Combinations of such methods may also be used.

If the length of exposure times is variable, the light system 6 may be configured such that the duration of the pulses of light provided remains constant and is set to be sufficiently long to provide lighting during the longest possible exposure of the camera. Alternatively, the duration of pulses provided by the lighting system may be configured to vary in the same way as the exposure time of the camera is varying, for example by cycling through a predetermined sequence and/or according to the time of day or lighting conditions. Additionally or alternatively, the light system and the camera system may communicate, for example using a wireless communication method, such as Wi-Fi™, to ensure the length of exposures and the light pulse durations are appropriately coordinated.

The camera controller 14 may comprise an internal clock (not shown) which may be updated according to the signal received from the first GPS receiver 12. The camera controller 14 may thereby be configured to control the camera 10 to capture images at a predetermined time or times. The camera controller 14 may be configured to control the camera to capture images with a certain delay from the predetermined time or times. For example, the camera may be configured to capture an image every 0.0625 seconds (i.e. 16 Hz) with images being taken with a delay of 0.001 seconds from an exact GPS time of 12:00:00, 12:00:00.0625 etc, such that images are captures with a frequency of 16 Hz, with the first image being captured at 12:00:00.001. The predetermined time or times and the delay used may be programmable.

Additionally or alternatively, the light controller 20 may comprise an internal clock (not shown) which may be updated according to the signal received from the second GPS receiver. The light controller may thereby control the lighting in a similar way to that described above with reference to the camera controller and the camera. The predetermined time or times and the delay used by the light controller 20 may different to those used by the camera controller 14 and may be separately programmable.

However the light and/or camera controllers are configured, they may refer to their respective internal clocks when controlling the operation of the light and/or the camera. This may be when no signal is being received from the first and/or second GPS receiver and/or between received signals.

As mentioned above, the camera 10 may not capture images at a substantially constant frequency and may instead capture images at discrete points in time.

Capture of such images may be triggered by the camera controller 14 or another controller (not shown). In this case, the camera controller may still consider the predetermined times and/or delays which have been set, together with the PPS signal from the first GPS receiver 12 and/or the time of its internal clock and may capture the image at the next suitable point after the capture has been triggered. In this way the triggered image may still be correctly illuminated by the light system 6, whilst the light system may still be operating to provide periods of illumination at regular intervals.

By using the system described above, images captured by the camera 10 may be correctly illuminated by the light 16 without the need for any communication between the camera system 4 and the lighting system 6 in order to synchronise the timing of their operation. However, the camera system and the lighting system may still communicate if desired, for example to coordinate exposure time and light pulse duration, as described above.

In other embodiments, not shown, a system of light systems and camera systems may be assembled which combines any combination of light systems and/or camera systems as described above. The system may be configured such that a light system provides lighting for more than one camera system. Additionally or alternatively, images captured by an camera system may be illuminated by more than one light system. Again additionally or alternatively, one or more camera systems and/or one or more light systems may be configured to operate sufficiently out of phase from one another, such that light from one or more light systems does not illuminate the images captured by one or more camera systems in any desired combination. Additional configurations and combinations of lighting systems and camera systems are also envisaged.

Although the description above has been given with reference to GPS receivers being used to provide time signals to the camera system 4 and the light system 6, it is equally envisaged that the camera system and/or the light system may receive time signals from any other time source capable of receiving the time wirelessly. For example the time source may be a Galileo global navigation satellite system, GLONASS or any other satellite system, a radio clock system, such as the time from the national physics laboratory broadcast from Anthorn radio station, or a computer system providing network time over a wireless network. Additionally or alternatively, the lighting system 6 and/or the camera system 4 may receive a time signal through a wired connection.

It will be appreciated by those skilled in the art that although the invention has been described by way of example, with reference to one or more examples, it is not limited to the disclosed examples and that other examples may also be constructed without departing from the scope of the invention as defined by the appended claims.

The invention claimed is:

1. A traffic monitoring system comprising:
a camera system configured to capture images of vehicles, the camera system comprising a first wireless time receiver configured to receive a wirelessly transmitted time signal, the first wireless time receiver being a first GPS receiver receiving a first GPS timing signal; and
a light system configured to selectively illuminate the vehicles, the light system being spaced apart from the camera system,
wherein the light system comprises a second wireless time receiver configured to receive the wirelessly transmitted time signal such that the image capture by the camera system and the illumination by the light system is synchronized, the second wireless time receiver being a second GPS receiver receiving a second GPS timing signal.

2. The traffic monitoring system according to claim 1, wherein the first wireless time receiver is a Global Navigation Satellite System (GNSS) receiver and the second wireless time receiver is a Global Navigation Satellite System (GNSS) receiver.

3. The traffic monitoring system according to claim 1, wherein the camera system is configured to capture images at a substantially constant frequency.

4. The traffic monitoring system according to claim 1, wherein the first wireless time receiver transmits a first timing signal to a camera of the camera system,
and wherein the second wireless time receiver transmits a second timing signal to a light of the light system, the first timing signal and the second timing signal being synchronized without transmission between the first wireless time receiver and the second wireless time receiver.

5. The traffic monitoring system according to claim 4, wherein the first timing signal and the second timing signal from the first wireless time receiver and the second wireless time receiver indicate a start of a second.

6. The traffic monitoring system according to claim 4, wherein the first timing signal or second timing signal is a pulse per second signal.

7. The traffic monitoring system according to claim 5, wherein the camera system is configured to capture images with a set delay from the start of the second indicated by the first timing signal.

8. The traffic monitoring system according to claim 4, wherein the camera system and/or the light system further comprises a clock, time on the clock being determined by the first timing signal or the second timing signal.

9. The traffic monitoring system according to claim 8, wherein timing of the image capture by the camera system the illumination provided by the light system is determined according to the time stored on the clock.

10. The traffic monitoring system according to claim 1, wherein the camera system is configured to capture images at a predetermined time or times.

11. The traffic monitoring system according to claim 1, wherein the camera system is configured to capture images with a set delay from a predetermined time or times.

12. The traffic monitoring system according to claim 1, wherein the camera system comprises an Automatic Number Plate Recognition (ANPR) camera.

13. The traffic monitoring system according to claim 1, wherein the exposure time of images captured by the camera system is variable.

14. The traffic monitoring system according to claim 1, wherein the exposure time of images captured by the camera system varies in a predetermined pattern.

15. The traffic monitoring system according to claim 1, wherein the exposure time of images captured by the camera system varies according to current lighting conditions or time of day.

16. The traffic monitoring system according to claim 1, wherein the light system is configured to provide pulses of illumination.

17. The traffic monitoring system according to claim 1, wherein the light system is configured to provide illumination only when an image is being captured.

18. The traffic monitoring system according to claim 1, wherein a period of illumination provided by the light system is substantially equal to the period over which an image is captured by the camera system.

19. The traffic monitoring system according to claim 1, wherein a frequency at which the light system provides periods of illumination is substantially equal to a frequency at which images are captured by the camera system.

20. The traffic monitoring system according to claim 1, wherein a frequency at which the light system provides periods of illumination is an integer multiple of a frequency at which the camera system captures images.

21. The traffic monitoring system according to claim 1, wherein the light system is a strobe light system.

22. The traffic monitoring system according to claim 1, wherein the light system provides periods of illumination with a frequency of 30 Hz or greater.

23. The traffic monitoring system according to claim 1, wherein a period of illumination provided by the light system is substantially equal to a longest possible exposure time of the camera system.

24. A camera system for use in the traffic monitoring system according to claim 1.

25. A light system for use in the traffic monitoring system according to claim 1.

* * * * *